March 29, 1966    R. P. WILTON ETAL    3,242,526
SHAPER FOR CANDLE SHANKS
Filed July 15, 1964
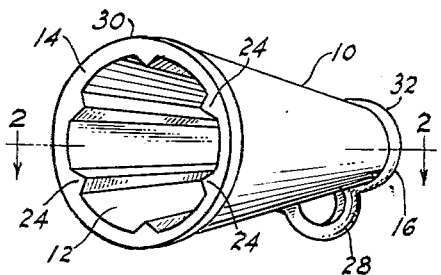
Fig. 1
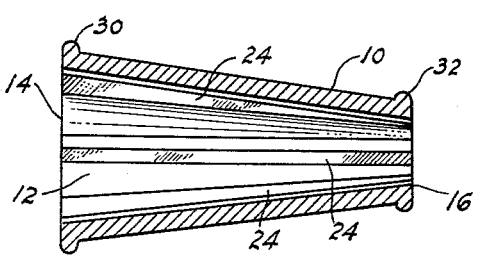
Fig. 2
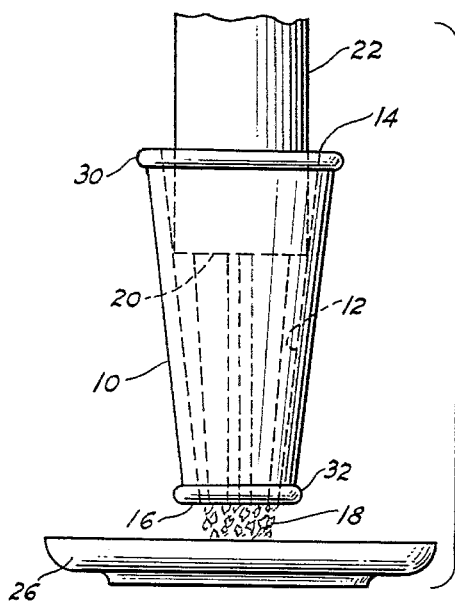
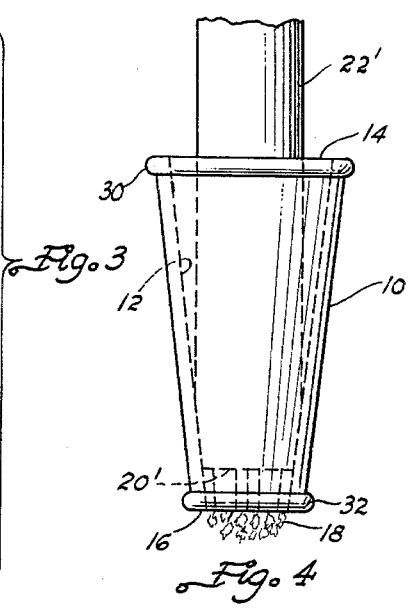
Fig. 3   Fig. 4
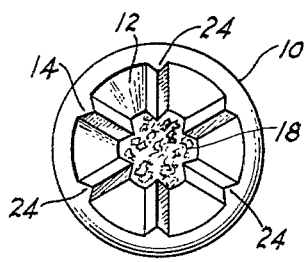
Fig. 5
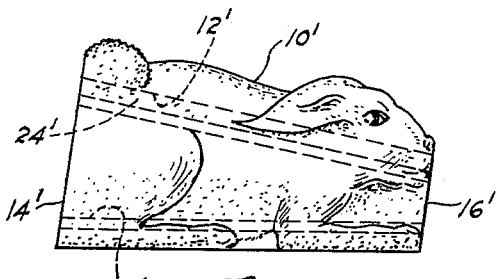
Fig. 6
INVENTORS.
RALPH P. WILTON
JOHN J. FITZPATRICK
By 
ATTORNEY United States Patent Office 3,242,526
Patented Mar. 29, 1966

3,242,526
SHAPER FOR CANDLE SHANKS
Ralph P. Wilton, S. 4th St., Wrightsville, Pa., and
John J. Fitzpatrick, P.O. Box 1, Hellam, Pa.
Filed July 15, 1964, Ser. No. 382,844
7 Claims. (Cl. 18—1)

The present invention pertains to a device to shape the shank ends of candles for ready fitting thereof into the sockets of candlesticks and holders of various types. More particularly, the invention pertains to a device for readily forming a tapered configuration on the shank ends of candles.

In order to insure the firm and accurate positioning of the shank or butt ends of candles within the receptacles or cavities provided therefor in candlesticks and candle holders or various types, it is customary for the candle manufacturers to form the shank or butt ends slightly larger in diameter than the socket or recess within which said shank ends are to be placed. This situation exists regardless of whether commercial varieties of candles are completely cylindrical in shape, especially at the shank or butt end, or are provided on the butt or shank end with a relatively slight taper which is provided for the purpose of at least slightly assisting in the fitting of such ends within the sockets or cavities which are to receive them. This condition nearly always results in the necessity to variously decrease the diameter of the shank or butt ends of candles in order to fit them into the normal sizes of sockets or recesses provided therefor in candlesticks or holders. Unless extreme care is exercised, it is very difficult to so decrease the diameter of said shank ends of candles so that they fit firmly and snugly within the candle holder sockets. Quite frequently, too much of the shank end of the candle is removed, whereby it is then necessary to transversely cut off a certain portion of the shank end and further attempt to reduce the diameter only to the required amount.

Even under the best and most carefully performed fitting of the shank ends of candles to the sockets therefor in candle holders, it is a tedious, time-consuming and frequently exasperating undertaking. Accordingly, it is the principal object of the present invention to provide a relatively simple, easily operated and substantially foolproof device for reducing the shank or butt end of candles in diameter, preferably in a slightly tapered configuration, and the removal of the excess body of the candle during the reduction of such diameter is performed in a gradual manner, which also will provide a regular configuration, as distinguished from a lopsided one, on such shank end of a candle, whereby the shank end is arranged readily to be fitted firmly and tightly into the socket of a candle holder intended therefor.

Another object of the invention is to provide a shaping device for the shanks of candles which is of a suitable size and is capable of suitably shaping and reducing the diameters of the shanks of candles of a relatively wide range of different diameters which, without limitation thereto, may be of the order of between ½″ and 1½″ in diameters.

A still further object of the invention is to provide a shaping device of the foregoing type which, in operation, may be oscillated so as to readily insure substantially symmetrical and even reduction of the shank ends of candles on all sides thereof, preferably producing a slightly tapered exterior configuration on the shank of each candle.

Still another object of the invention is to provide a shaping device of the type referred to above which may be inexpensively manufactured from a reasonably wide range of different materials, in attractive configuration, lending sales appeal thereto in addition to being utilitarian, and such device substantially frees itself of shavings comprising the excess portions of the candle shanks removed from the candles incident to shaping the same to the desired size.

Details of the foregoing objects and of the invention, as well as other objects thereof, are set forth in the following specification and illustrated in the accompanying drawing comprising a part thereof.

In the drawing:

FIG. 1 is a perspective view of an exemplary candle shaper embodying the principles of the present invention as viewed from the larger, entrance end thereof and showing a preferred arrangement of desired configurations of interior ribs which accomplish the removal of the excess portions from the shank end of a candle.

FIG. 2 is a longitudinal sectional view of the candle shaper shown in FIG. 1, as seen on the line 2—2 of said figure.

FIG. 3 is a side elevation illustrating the preferred manner of operating the candle shaper shown in the preceding figures and illustrating a fragmentary portion of a candle shank in process of being shaped by the candle shaper and showing the discharge of shavings from the lower, smaller end thereof.

FIG. 4 is a view partially similar to FIG. 3 and illustrating the same candle shaper in process of shaping in the shank end of a candle of smaller diameter than that shown in FIG. 3.

FIG. 5 is an end view of the candle shaper shown in the preceding figure as seen from the larger, entrance end thereof.

FIG. 6 is an exemplary side elevation of another configuration of body for the candle shaper illustrated in the preceding figures, the purpose of FIG. 6 being to exemplify the esthetic characteristics which might be imparted to the exterior of the body of such shaper.

The candle shaper comprising the present invention, as illustrated in exemplary manner in the figures of the attached drawing, comprises a body 10 which may be formed, preferably by molding, from a rather substantial range of different materials including various types of metal, and especially aluminum, plastics of many different types, but preferably those which are relatively rigid when cured, glass and ceramic materials of various kinds. The body 10 is provided with an interior cavity 12, which preferably is conical and the largest end thereof opening outwardly at the entrance end 14 of the body. In the preferred construction of the candle shaper 10, the opposite, smaller end 16 thereof also is open to form a discharge or exit opening for shavings 18 comprising excess material removed from the exterior of the shank end 20 of a candle 22, as will be best seen from FIGS. 3 and 4.

To remove excess material from the shank or butt end of candles in order to permit the same to be more readily and firmly fitted into sockets or similar receiving means formed in candle holders of various types, there is provided within the cavity 12 a plurality of ribs 24, which are preferably evenly spaced circumferentially around the inner conical wall defining the cavity 12. Further, the ribs preferably lie within planes which pass through and are parallel to the central longitudinal axis of the shaper 10. However, if desired, at least a slight skew may be imparted to said ribs but it has been found that the specific arrangement illustrated in the drawing functions to a high degree of satisfaction and therefore is the preferred arrangement as to shape and disposition of said ribs relative to the interior of the body of the candle shaper 10.

Further in accordance with the preferred construction of the invention, the opposite sides of the walls defining the conical cavity 12 subtend an angle of approximately 15°, which is the optimum desired angle. However, it is to be understood that this angle may be varied from slightly less than 15° to approximately 20°, but preferably not substantially in excess of 20°. In accordance with the preferred operation of the candle shaper, it is desired to provide only a relatively gradual taper on the shank of the candle which is to be shaped by said shaper, whereby substantial and firm engagement of said shaped shank end of the candle will be effected with the interior walls of a socket in a candle holder to receive the same, even though a certain amount of conformity of the shaped shank end of the candle to such candle holder socket may have to be resorted to, by force, as usually is necessary incident to fitting a candle into a candle-receiving socket.

To insure somewhat gradual removal of excess material from the shank end of a candle by the shaper comprising the present invention, and also to facilitate the uniform and even, concentric shaping of such shank end of a candle into a gradual tapered arrangement concentric with the axis of the candle, it is preferred that the ribs 24 each comprise a pair of angularly related surfaces which, in cross-section, define equilateral triangles and preferably subtend an angle not appreciably less than 90°, nor substantially greater than 120°. Hence, it will be seen that said opposite side surfaces of the ribs 24 are disposed at an obtuse angle with respect to each other. The meeting line of said side surfaces also preferably is relatively sharp to define an adequate cutting edge constituting the apex of each of the angular type ribs 24. Such a shape of the ribs 24 has been found to effect adequate cutting of even relatively hard candle substances, quickly, effectively, and evenly. Further, by making the cross-sectional shapes of the ribs 24 equilateral in nature, oscillation of the candle shaper with respect to the shank end of a candle through an arc at least equal to that extending between two adjacent ribs, will minimize wrist and hand motion necessary in order to effect desired shaping of the shank ends of candles and also will facilitate accuracy in achieving circumferentially even removal of excess material from such shank ends.

Further to insure regular and even removal of excess material from the shank ends of candles around the exterior thereof, it is preferred that the number of ribs at least exceed two, whereby a minimum of three is required to insure such even removal of excess material. However, to employ a greater number than three is preferable and, as illustrated specifically in the drawings, a total of six is shown. This number has been found to be relatively ideal in that it provides adequate clearance space between adjacent ribs through which the removed, excess material depicted by shavings 18 in FIGS. 3 and 4, may pass to the discharge end 16 of the shaper 10 and be received in a suitable receptacle, such as a dish or saucer 26. In order that adequate clearance spaces between the ribs 24 is provided for such passage of removed material, it is preferred that the total number of ribs not substantially exceed 12.

In order that the shaper 10 may be arranged to accommodate a relatively wide range of different diameters of candles, it is preferred that the length thereof be substantially greater than the diameter of the larger, entrance end thereof and, for most practical purposes, it is further preferred that the diameter of the entrance end of the cavity 12 not be substantially less than about 1½", whereby if the total length of the shaper is approximately 2½", the diameter of the smaller, exit end of the cavity 14 will be approximately ⅝" in the preferred, optimum configuration of such cavity, disregarding the ribs in such dimensions.

To illustrate the versatility of the candle shaper comprising the present invention, due to the provision of a substantial length and relatively wide range of diameters between the entrance and exit ends of the cavity 12, it will be seen from FIGS. 3 and 4 respectively, in which candles of two substantially different diameters are illustrated in process of being shaped, that a substantial range of different diameters of candles may be accommodated for purposes of having the shank ends thereof shaped, as desired, by reducing the diameter thereof, preferably in a slightly tapered manner. Specifically, it will be seen that the candle 22' of FIG. 4 is substantially less than the diameter of candle 22 shown in FIG. 3. Further, the shank end 20' of the candle 22' is being operated upon by the candle shaper 10 much nearer the exit end 16 thereof than the candle 22 shown in FIG. 3 wherein the portion of the shaper 10 which engages the terminal end 20 of the candle 22 is adjacent the entrance end 14 thereof. For purposes of simplifying the views in FIGS. 3 and 4, no attempt has been made to illustrate the ribs 24; only an outline of the interior cavity 12 being represented.

For purposes of convenience, especially to assist in holding the candle shaper 10 and to facilitate the rotation thereof relative to the shank end of a candle, the body of the shaper 10 may be provided preferably with an integral, projecting handle 28, or any other suitable means such as a rib or serrated surface. One advantage of the particular shape of handle 28 shown in FIG. 1, however, is that it also provides hanging means, for example, whereby the shaper may be stored, when not in use, by suspending it from an appropriate hook or the like. The handle 28 preferably may be formed incident to the molding of the entire shaper 10. Incidentally, while an appropriate molding core will be used incident to molding the shaper 10 to form the inner surfaces of the cavity 12 and the ribs 24, the molding otherwise need comprise only a two-part mold including coengagable halves.

Whereas the specifically illustrated shaper 10 shown in FIGS. 1-5 has an exterior surface generally similar to the tapered cavity 12, it is not essential that the exterior shape be made so utilitarian. Hence, in addition to providing terminal, annular ribs 30 and 32, which preferably are for esthetic purposes as well as to facilitate handling the shaper to enhance the grip thereof by the user, it is possible to form the exterior of the candle shaper in any suitable configuration desired. In this regard, an exemplary animal configuration is illustrated in FIG. 6, it being understood that this configuration is merely exemplary and not restrictive. Any appropriate shape of animate or inanimate object may be selected as long as there is the possibility of providing on the interior of the body 10 of the shaper a preferably conical cavity 12' and a desired number of ribs 24', which extend between the entrance end 14' and the preferably open, exit end 16'. In addition to molded, esthetic configurations of various kinds which may be imparted to the exterior of the body 10 of the shaper, it is to be understood that the same likewise may be otherwise suitably decorated such as by painting, lithographing, printing, or otherwise.

It will be seen from the foregoing that the present invention satisfies a long felt need in connection with placing candles in candle holders, especially where the shank ends of the candles are somewhat oversized with respect to the diameter of the sockets to receive the same in the candle holders. By using a candle shank shaper embodying the principles of the present invention, only the desired amounts of the excess material on the shank ends of candles can be removed, evenly and uniformly, with minimum effort, by simple oscillating movement between the shaper and shank end of the candle respectively held in the two hands of the operator. The design and placement of the functioning ribs 24 is such that they will not scrape or cut too deeply or too quickly incident to each movement of the shaper relative to the candle. Particularly in view of the preferred number of ribs utilized and the even spacing thereof around the circumference of the cavity 12 of the shaper, centering of the shank ends of candles within the cavity 12 is assured, whereby the final, slightly tapered shape imparted ot the shank end of the candle will be evenly disposed around the circumference thereof.

While the invention has been described and illustrated in its several preferred embodiments, it should be understood that the invention is not to be limited to the precise details herein illustrated and described since the same may be carried out in other ways falling within the scope of the invention as claimed.

We claim:

1. A shaper for the shank end of candles comprising a body provided with a conical cavity therein having the largest end opening outwardly at one end of the body, the sides of the cavity subtending an angle not appreciably greater than 20°, and a plurality of ribs in excess of two projecting radially from the walls of said cavity and extending longitudinally of said cavity, said ribs being evenly spaced circumferentially around the interior of said cavity and having angularly related sides subtending an angle not appreciably less than 90° to provide apexes comprising cutting edges operable to shave material from the bases of candles when rotated relative to said ribs and the bases of said ribs being spaced circumferentially from each other at the larger end of said cavity a distance at least substantially as great as the width of the bases of said ribs to provide discharge spaces for shavings removed from candles by said ribs, the opposite ends of said cavity being open for the discharge of shavings therethrough from said spaces.

2. The shaper according to claim 1 in which the angularly related sides of the ribs define a substantially equilateral triangle in cross-section to permit reverse oscillation of said shaper relative to the end of a candle to provide a tapered shape thereon complementary to that of said cavity.

3. The shaper according to claim 1 in which the angle between the sides of said cavity is substantially 15° and the angle between the sides of said ribs is substantially 120°.

4. The shaper according to claim 1 in which the axial length thereof is substantially greater than the diameter of the largest end of the cavity and said diameter of the largest end of the cavity is at least approximately 1½″.

5. The shaper according to claim 4 in which there are at least three evenly spaced ribs and not substantially in excess of twelve ribs.

6. The shaper according to claim 1 further provided with means projecting from the exterior thereof and manually engageable to facilitate holding said shaper and rotating the same without slipping in the hand of the operator while shaving a candle.

7. The shaper according to claim 6 in which said projecting means is apertured to receive a hook for hanging the shaper to store the same.

References Cited by the Examiner

UNITED STATES PATENTS

| | | |
|---|---|---|
| 330,200 | 11/1885 | Baumer. |
| 941,083 | 11/1909 | Manbeck _____ 18—27 X |
| 1,451,163 | 4/1923 | Hope. |
| 1,993,709 | 3/1935 | Chamberlain _____ 18—1 |
| 2,393,767 | 1/1946 | Gould _____ 69—23 |

FOREIGN PATENTS 670,133    4/1952    Great Britain.

WILLIAM J. STEPHENSON, *Primary Examiner.*